Figure 5:
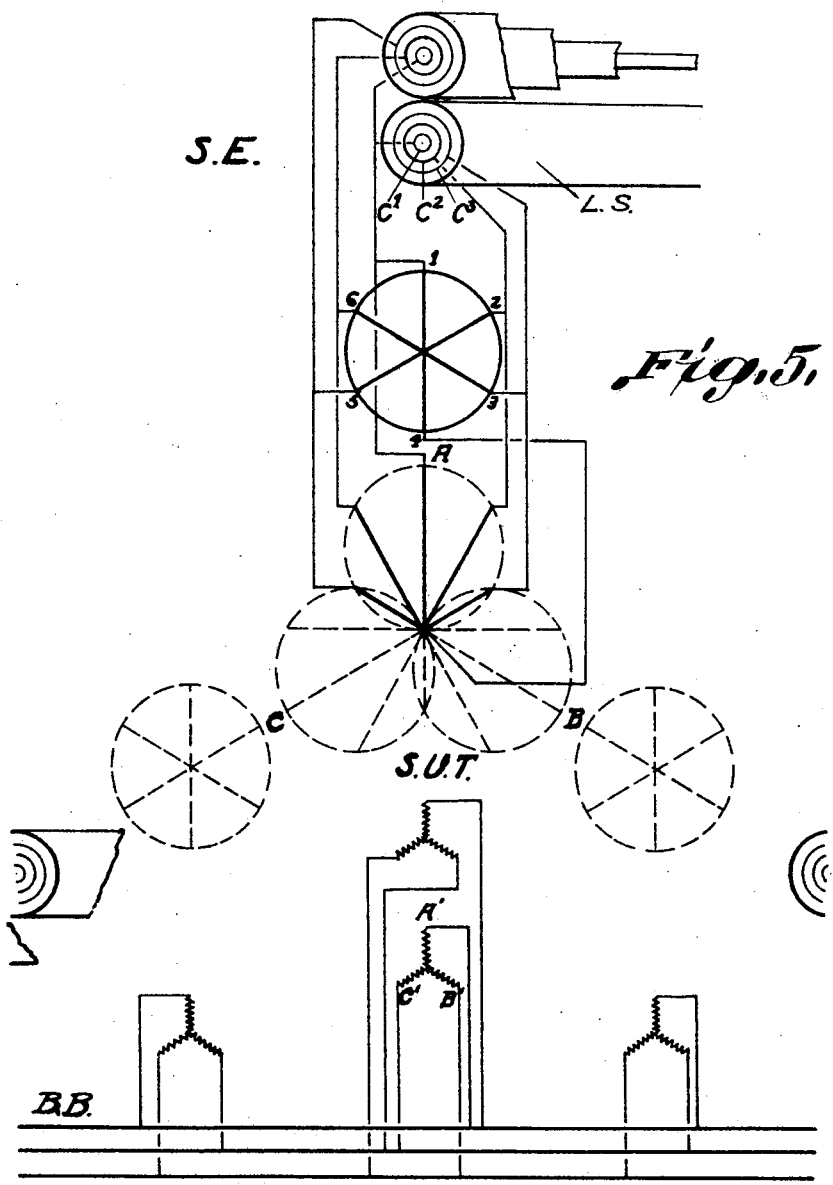

April 21, 1925.　　　　　　　　　　　　　　　1,535,057
A. M. TAYLOR
ELECTRICAL POWER TRANSMISSION SYSTEM
Filed June 11, 1921　　　3 Sheets-Sheet 1
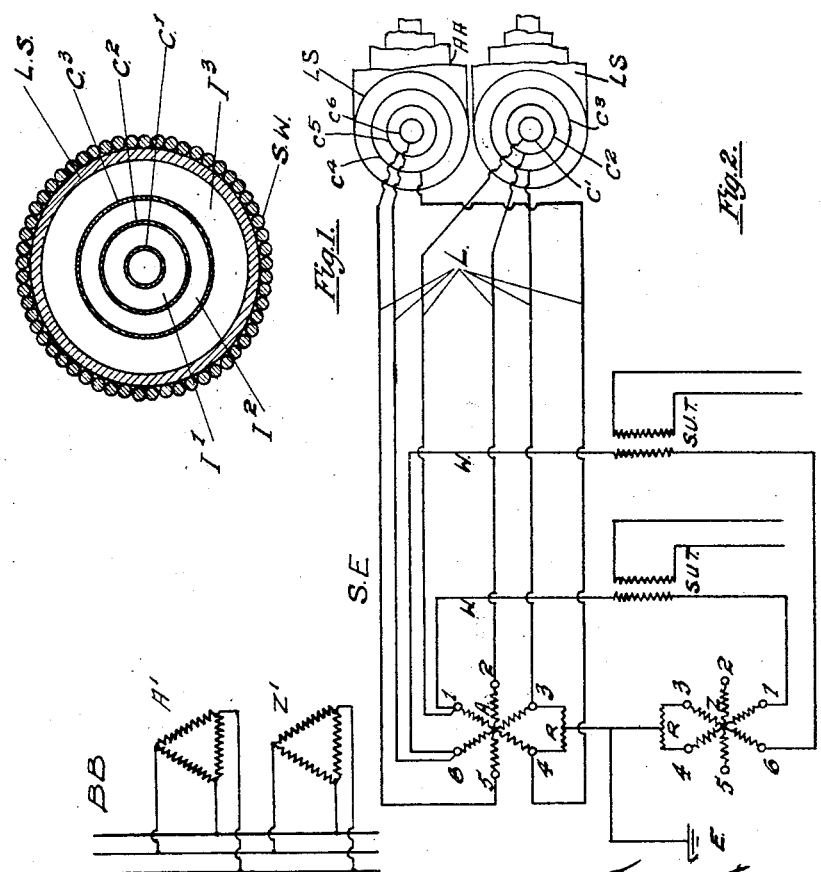
Inventor.
Alfred Mills Taylor
By Harold C. Thorne
His Attorney.

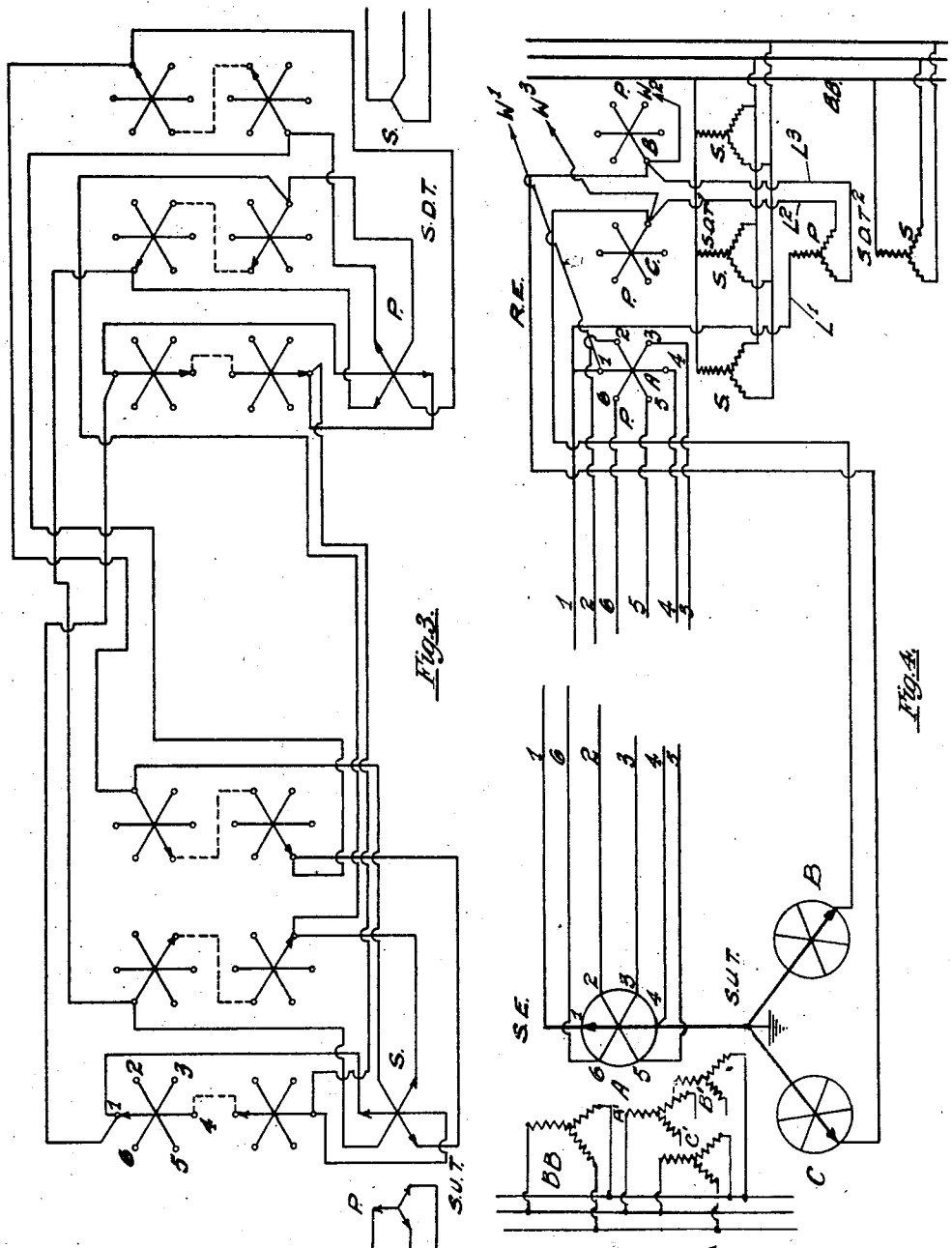

April 21, 1925.

A. M. TAYLOR 1,535,057

ELECTRICAL POWER TRANSMISSION SYSTEM

Filed June 11, 1921   3 Sheets-Sheet 3

Inventor
ALFRED MILLS TAYLOR
By Harold C. Thorne
Attorney

Patented Apr. 21, 1925.

1,535,057

UNITED STATES PATENT OFFICE.

ALFRED MILLS TAYLOR, OF ERDINGTON, BIRMINGHAM, ENGLAND.

ELECTRICAL-POWER-TRANSMISSION SYSTEM.

Application filed June 11, 1921. Serial No. 476,642.

*To all whom it may concern:*

Be it known that ALFRED MILLS TAYLOR, a subject of Great Britain, residing at Erdington, Birmingham, England, has invented certain new and useful Improvements in Electrical-Power-Transmission Systems, of which the following is a specification.

The present invention relates to improvements in electrical power transmission systems and has for its object the employment of higher voltages upon, in particular, long distance electric power transmission lines. In existing 3-phase systems employing a three core cable great difficulties are found in the insulation directly the voltage is increased above existing practice, principally because each core has to be insulated for the full voltage not only from its fellows but for a large voltage also to earth. The result of this is that since the diameter of cables is limited for practical purposes to some 4" overall diameter and since owing to the above-mentioned insulation difficulties a very large proportion of the cable consists of insulation and of empty spaces between the insulation the limit of voltage is very soon reached. A further difficulty is that owing to the pulsating and rotating electro-static fields inside the cable, the electro-static stresses are not even uniformly set up around the insulation surrounding each core, and also what are known as tangential stresses are set up gravely impairing the value of the insulating material.

In order to overcome the aforesaid difficulties it has been proposed to separate the three cores into separate cables, but this solution has the disadvantage in that as the operating core is at the centre of the cable its diameter, for the transmission of reasonable amounts of power, is relatively small, and it is known that where this relation holds between the diameter of the core and the diameter of the cable, the insulation is only employed to its maximum efficiency where it is in close proximity to the copper. Hence the outer layers of insulation take up a great deal of space and are very ineffective.

The present invention aims at overcoming the aforesaid difficulties, and consists in one form in the transmission of polyphase alternating currents having star connected sources through the concentric cores of a single pair of cables wherein the polyphase system is earthed at one of its phase extremities, or at a point intermediate between two adjacent phase extremities, and the innermost cores are connected to those phase extremities the potentials of which are farthest removed from earth. The present invention further resides in the extension of the aforesaid transmission system to two or more polyphase systems and the corresponding number of cables, and in the better utilization of the electrical apparatus for the aforesaid purpose.

By the said means of transmission (i. e. a pair of cables combined with a 6-phase transmission) I obtain the advantage of being able to arrange that the insulation required between every core and its adjacent core, or between certain cores and earth, shall be closely suited to the natural construction of a concentric-cored cable, a result which could not be obtained by the use of a concentric 3-core cable with a 3-phase system.

In another system of distribution of electrical energy each main conductor is divided into a plurality of subsidiary conductors whereof the innermost conductor of each subsidiary conductor is run at the full voltage of the system, whilst the remaining subsidiary conductor (or conductors) is (or are) arranged concentrically or externally relatively to the innermost conductor, and is (or are) operated at relatively lower voltages which decrease in the order of the distance of the respective conductors from the innermost conductor. The cable used in the aforesaid system comprises a plurality of conductors which may be arranged concentrically, or some internally relatively to another or others, the innermost of each conductor operates at the highest voltage and the outermost at relatively lower voltages, these voltages decreasing in the order of the distance of the respective conductors from the innermost.

Describing generally my improved transmission system for polyphase currents, instead of three-core or six-core cables, all of which present the difficulties as aforesaid, I employ preferably triple-concentric cable and proceed, in the case of a 6-phase transmission, as follows:—

Phase (1) is connected to the innermost core, phase (2) to the next (concentric) core, and phase (3) to the outermost core of one of a pair of cables; phase (4) to the outermost core of the second cable of the pair, phase (5) to the middle core, and phase (6) to the innermost core of the said cable. I leave a depth of insulation between the outermost cores of the two cables and the lead sheathing.

The concentric cores connected to phases 3 and 4 are thus the only cores directly between which and "earth" any stress is experienced but the voltage-gradient at the surfaces of these cores can be kept quite low on account of their large diameter as compared with the single phase cables hereinbefore referred to. The central cores, or central and intermediate cores, being within the outer cores, are shielded thereby so that there is no stress directly between the inner cores and the earth.

The unequal capacities to earth of the various cores in one cable may be compensated for, if desired, by reactance inserted in some of the transformer windings. Alternately, external capacity may be added on those cores which have the smaller capacities.

My present invention will now be described with particular reference to the accompanying series of diagrams. In these diagrams the following symbols have the following meanings throughout:—I., insulation; L. S., lead sheathing; L., leads or cables; W., wires; S. D. T., step-down transformer; S., secondary; B. B., busbars; C., cable core; S. W., steel wire; R., resistance or choke coils; S. U. T., step-up transformer; P., primary; S. E., sending end; Z., secondary of 6-phase transformer; R. E., receiving end.

Fig. 1. is a section of the triple-concentric form of cable proposed to be employed.

Fig. 2. is a diagram indicating how a pair of these cables may be combined with the 6-phase secondary system of a step-up transformer for the purpose required, and the diagram also shows how the system may be completely duplicated on the negative side of "earth" with a view to increased voltage of transmission.

Fig. 3. shows how three such systems as in Fig. 2. each capable of independent operation, may be combined into a 3-phase transmission.

Fig. 4. indicates how similar results may be obtained, but with half the number of cables shown in Fig. 3.

Fig. 5 shows a slightly modified arrangement.

Referring to the cable shown in Fig. 1, the insulation ($I^1$) ($I^2$) ($I^3$) between the cores ($C^1$) ($C^2$) ($C^3$) would in this case be of paper impregnated with suitable compound such as is usually employed in the manufacture of 3-core cables for extra-high-tension work.

Outside the insulation ($I^3$) is a lead sheathing (L. S.) and exterior to this may be an armouring of steel wires (S. W.).

Referring now to the diagram Fig. 2, and considering firstly the upper portion of the high tension system represented in this diagram, A represents secondary windings with the 6 radii a star-connected 6-phase secondary system of a step-up transformer, which windings are connected with the upper pair of cables (A A) shown in right hand side of the diagram, the phase points, 1, 2, 3, 4, 5, 6, being connected with the concentric cores, $C^1$, $C^2$, $C^3$, $C^4$, $C^5$, $C^6$, by cables (L) the two outermost cores ($C^3$) and ($C^4$) being connected through a reactance or choke coil (R) the mid-point of which is earthed.

Below this, in the same diagram, is a precisely similar arrangement, in which however the currents generated by the transformer secondary windings Z flow towards the earth connection instead of away from it. Above the secondary windings A and Z of the high tension system are represented corresponding primaries A' and Z' for these transformers, which for convenience are represented as having delta connected windings fed from the low tension supply bus bars B. B. in the generating station, or sending end of the line. If now, additional wires (W) are led from the points shown to the two additional transformers (S. U. T.), provided with suitable secondaries as shown, a single phase current of double, or substantially double, the presure of each of the two 6-phase systems can be passed from the two 6-phase systems into these transformers; and inversely, a current from a single-phase generator could be passed into the secondary windings of these two transformers (at the sending end of line) and caused to generate in the primary windings a current of a pressure equal to double that of the two 6-phase systems and this single current can be superposed upon the existing 6-phase system in the manner shown; and if this arrangement be repeated at the receiving end of the line the said single-phase current can there be withdrawn through a similar pair of step-down transformers and used to supply translating devices. By this arrangement double the voltage can be employed for the single-phase transmission which is available on either of the 6-phase transmissions, and the advantage is obtained that any one of the four cables may break down without putting the whole system out of operation.

Referring now to the diagram Fig. 3, this illustrates the same principles of transmission which are shown in Fig. 2, but repeated three times over, in a manner to obtain a 3-phase transmission.

In this case a step-up transformer having its secondary connected in double-star (S. U. T.) will be employed in the manner shown instead of the step-up transformers shown in Fig. 2. At the receiving end the arrangements are simply repeated with a step-down transformer (S. D. T.)

Referring now to the diagram Fig. 4, an arrangement is shown whereby instead of six 6-phase systems and six pairs of 3-core cables (as in Fig. 3) three 6-phase systems (A) (B) (C), vectorially represented are employed and three pairs of 3-core cables (not shown).

In this arrangement however, the connection of the phases (3) and (4) of, for example, system (A) to earth, shown in Fig. 2, are abandoned, and instead of this each individual 6-phase system (A) (B) or (C) is allowed to float at a potential in relation to earth which is determined by the secondary winding of a 3-phase step-up superposing transformer (S. U. T.) shown vectorially and whose primary winding is shown at A′, B′, C′, to the left in the diagram, and this transformer is arranged to feed into each of these 6-phase systems at the points of highest potentials or alternatively at the neutral point, or other points on the circumference as hereinafter set forth. The neutral point of this transformer secondary is earthed.

A somewhat similar arrangement is carried out at the receiving end, where the primaries (P P P), vectorially represented, of the three receiving transformers (S. D. T.¹) are arranged not only to connect with the six cores of their individual 6-phase systems but also have special leads (L¹) (L²) and (L³) from points 120 degrees apart in phase relation and are led to the separate phases of a step-down transformer (S. D. T.²) the secondaries of which feed into the same busbars (B. B.) as do the secondaries (S. S. S.) of the three transformers (S. D. T.¹).

In some cases the self-contained 6-phase systems, operating with lesser voltage than the superposed current 3-phase system, would not be carried to such distances, and would stop at a given substation, as shown, while other conductors (W¹) (W²) (W³) would continue the 3-phase transmission by itself, preferably in the form of overhead lines to a more distant substation.

The arrangement according to Fig. 4 is further disclosed in inventor's British Patent No. 195,429 of 1923, and corresponding United States Patent No. 1,466,069 of August 28, 1923, in which each phase of a major star transformer is superposed upon a 6-phase system in the same manner, and the transformers feed into pairs of triple concentric conductors and three single-core cables or one three core cable for carrying the lower potentials of the three 6-phase systems. The specific connections between the transformers and the cables are fully set forth in the said United States patent, in which it is assumed that the superposing E. M. F.'s may vary from the E. M. F.'s of the phases of the 6-phase systems and therefore the ordinary cable or cables are employed for the lower potentials. It will be noted in the arrangement according to Fig. 4 in the present application, phase 1 is highest in potential from the "earth" and phases 2 and 6 are intermediate in potential between phase 1 and phases 3 and 5, and phase 4 may be at a low potential, or arranged conveniently to be at a common "earth" potential in which case it can be connected with the neutral point of the transformer A B C, as shown in Figure 5. This neutral point may either be allowed to float at a potential determined by the potential gradient in the insulation between the outermost cores of the line cables and their casings, lead sheathings, or earthed directly. In Figure 5, as in the patents above referred to, the phase 1 is connected with the innermost cores of the triple concentric cables, phases 2 and 6 with the intermediate cores, and phases 3 and 5 with the outer cores.

As an alternative to the connecting of the three phases of the superposing step-up transformer as disclosed in connection with Figures 3 and 4, I may employ direct connections, as vectorially represented in Figure 5, to a number of points on these 6-phase systems, the necessary E. M. F.'s being supplied by transformer windings. It will be noticed that, from the neutral point of the superposing transformer (S. U. T.) at the sending end, are shown five radiating windings on phase A which are connected respectively with the phases (1) (2) (3) (5) (6) of the 6-phase system further from the earth potential. Similar radiating windings are connected to corresponding phases of the systems (B) and (C) at the phases farthest removed from the neutral point of the superposing transformer.

In several figures of the drawings are represented bus bars B. B. to which a plurality of three phase transformer primary windings are connected, the number of primary windings in each case being the same as the corresponding secondaries connected with the high tension cables leading from the generating station, or sending end, to the receiving end of the line. For purposes of illustration of the invention, these primaries have been illustrated in relative positions in the same manner as the secondaries are shown. However, it is obvious that the number of transformers may be reduced, for example, instead of four transformers, or primaries, as represented in Figure 4, a single transformer having a plurality of distinct secondary windings can be used, in which case one is for transmitting the power at a high potential through central cores for each phase of the major star system and the remaining smaller windings are for feeding the 6-phase systems for keeping the various cores at their respective potentials and in proper phase relation as set forth.

In Figure 5 a single primary A' B' C' has been represented for supplying each of the superposing secondaries; it will be obvious here that the proper phases may be obtained by various connections of secondary windings on the transformer; the complete disclosure of a phase modifying transformer is therefore omitted. Similarly the secondaries of the transformers S. U. T. shown in Figure 2 may be fed from the bus bars B. B., as by means of a phase of a star connected transformer connected with these bus bars.

It will be understood that in place of the three core cables and six-phase systems my method of transmission may equally apply to 6 core cables and 12-phase transmission.

In Figures 3, 4 and 5 the star connected sending and receiving extra-high-tension windings are shown twisted through 30 degrees in a clockwise direction with reference to those shown on Fig. 2, which latter shows the preferred position. In Figure 2 it will be noted that the voltage obtaining between the point 3 (the outermost core) and the lead sheath of any cable is very much less than that obtaining between the point 3 and the lead sheath of any cable in Figures 3, 4 or 5, and for that reason in some cases it may be expedient to increase the voltage of the superposing transformers in Figure 2 and give a pressure between the point 3 and the lead sheath intermediate in pressure between that obtaining in Figures 3, 4 and 5 and that obtaining in Figure 2.

Having now particularly described and ascertained the nature of my said invention, and in what manner the same is to be performed I declare that what I claim is:—

1. A transmission system for polyphase alternating currents having a star connected source, including a pair of cables having concentric cores, a connection for earthing the polyphase system at one of its phase extremities, and connections between the source and the cores of said cables with the innermost cores of the cables connected to those phase extremities the potentials of which are farthest removed from earth.

2. A transmission system for polyphase alternating currents having star connected sources, including pairs of cables having concentric cores with which said sources are connected, connections between certain phase extremities, a connection for earthing a point intermediate between two such adjacent connected phase extremities, and connections between the innermost cores of said cables and those phase extremities the potentials of which are farthest removed from earth.

3. A transmission system for polyphase alternating currents having star connected sources, including two pairs of cables having concentric cores and two polyphase systems connected with said cores, said two polyphase systems having an earthed connection between certain phase extremities of the two systems whereby the diametral current in the one polyphase system flows from the earthed connection to the point furthermost in potential from earth in that system and in the other system flows from the furthermost point of potential from earth to the earth connection, connections for causing the two phase extremities of furthermost potential to receive from or deliver into the central cores of the cables a single phase current of substantially twice the pressure obtaining in either system, the polyphase systems simultaneously functioning.

4. A transmission system for polyphase alternating currents, including pairs of cables having concentric cores and a polyphase system connected with the cores of each pair of cables and wherein said polyphase systems have no direct connection with earth, single phase sources connected between the earth and such points in said systems furthermost in potential from each other whereby the potentials of said systems are forcibly fixed with respect to the earth and the E. M. F.'s of the single phase sources may be increased.

5. A transmission system for alternating currents including three pairs of cables having concentric cores carrying three polyphase systems arranged in three phase relationship with each other, single phase sources having connections with the cores of the cables of each of said polyphase systems whereby the three phase relation is obtained between the three systems, and so that the currents of the three phase system thus obtained are passed over the central cores of the six cables at potentials farthest removed from each other.

6. A transmission system for polyphase alternating currents, including cables having concentric cores with which phases of a plurality of polyphase systems are connected from their respective sources, a star connected source for a greater transmission system having connections for feeding into the cores of said cables with which said polyphase systems are connected so that radial E. M. F.'s of said systems are caused to substantially superpose the E. M. F. required for the greater transmission system.

7. A transformer system for polyphase alternating currents, including cables having a plurality of cores with which phases of a plurality of polyphase systems are connected from their respective sources, a star connected source for a greater transmission system having connections for feeding into said polyphase systems so that radial E. M. F.'s of said systems are caused to substantially superpose the E. M. F. required for the greater transmission system whereby the current of the greater transmission is distributed among several cores of the cables.

8. A transmission system including concentric cored cables having the phases of a polyphase alternating current system connected with said cores and so arranged that the phases of the system highest in potential are connected with the innermost cores, and a single phase source connected with a point in the polyphase system.

9. A transmission system for polyphase alternating current systems including a plurality of cables having concentric cores and arranged in pairs, each pair of cables conducting the phases of a polyphase system, and superposing sources connected with points of the polyphase systems furthermost in potential from each other.

10. A transmission system for polyphase alternating currents including concentric cored cables for transmitting systems of polyphase currents so arranged that the phases of the systems furthermost in potential from each other are connected with the innermost cores, and single-phase sources connected with a point of each polyphase system.

11. A transmission system for polyphase alternating currents having a star connected source, including a pair of concentric cored cables having connections with said source such that the phases highest in potential are connected with the innermost cores.

12. A transmission system for polyphase alternating currents having star connected sources, including cables having concentric cores with which a plurality of polyphase systems having star connected sources are connected, and a star connected source for a greater transmission system having connections for feeding into the central point of each of said polyphase systems which are connected with the cores of said cables.

13. A transmission system for polyphase alternating currents having a star connected source, including concentric cored cables having connections with said source such that the phases highest in potential are connected with the innermost cores, and a source of alternating current having a connection for feeding into the central point of said polyphase system.

In testimony whereof I affix my signature.

ALFRED MILLS TAYLOR.